(No Model.)

S. J. LAUGHLIN.
ORGAN PEDAL.

No. 363,652. Patented May 24, 1887.

Witnesses.
F. B. Fetherstonhaugh
J. M. Jackson

Inventor
S. J. Laughlin
by Donald C. Ridout & Co
Attys

UNITED STATES PATENT OFFICE.

SAMUEL JOHN LAUGHLIN, OF GUELPH, ONTARIO, CANADA.

ORGAN-PEDAL.

SPECIFICATION forming part of Letters Patent No. 363,652, dated May 24, 1887.

Application filed February 28, 1887. Serial No. 229,085. (No model.)

*To all whom it may concern:*

Be it known that I, SAMUEL JOHN LAUGHLIN, of the city of Guelph, in the county of Wellington, in the Province of Ontario, Canada, factory foreman, have invented certain new and useful Improvements in Organ-Pedals, of which the following is a specification.

The object of the invention is to so arrange the pedals of an organ that when they are not in operation they shall completely close the pedal-box, and at the same time to so secure them in position that the webbing connecting them to the bellows may be readily got at and adjusted; and it consists, essentially, in providing a frame hinged or pivoted to the pedal-bracket and screwed or otherwise fastened to the pedal-base, the said frame having apertures made in it slightly smaller than the pedals, which are each pivoted to the heel-piece of the frame behind their respective apertures and are connected to the webbing for operating the bellows, substantially in the manner hereinafter more particularly explained.

Figure 1:
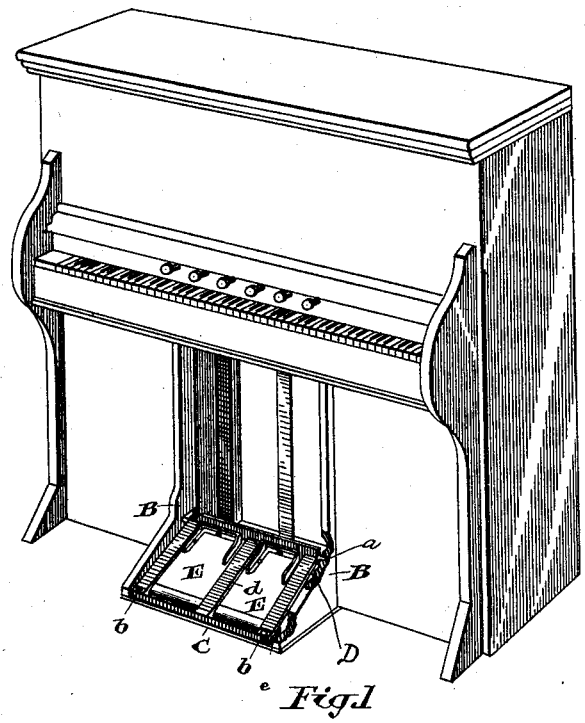
Figure 2:
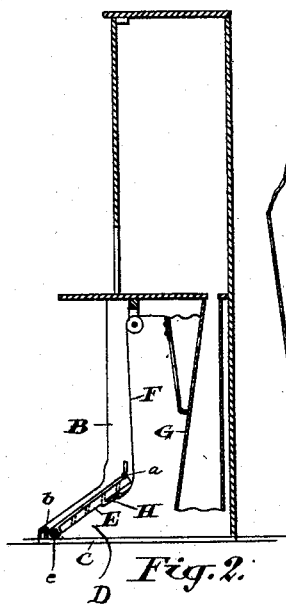
Figure 3:
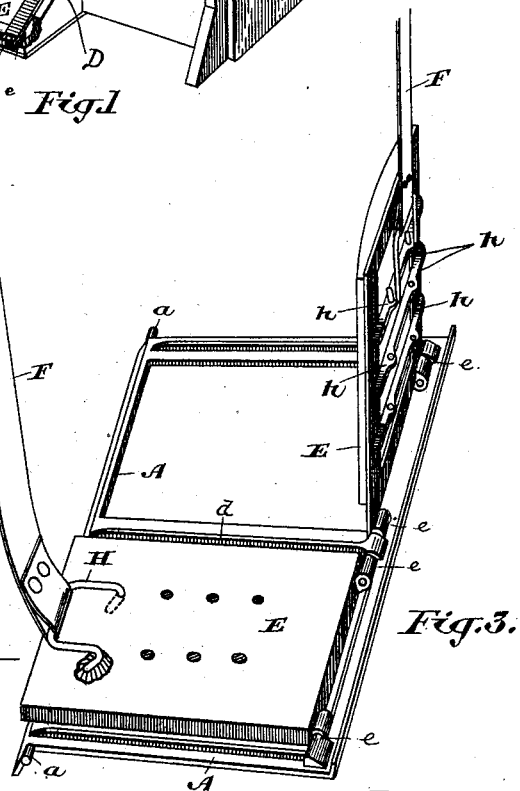

Figure 1 is a perspective view of an organ provided with my improved pedal. Fig. 2 is a cross-section of the same. Fig. 3 is an enlarged detail of the under side of the pedal-frame.

In the drawings, A represents a frame pivoted at $a$ to the pedal-bracket B, the pivot-connection at $a$ being of such a nature that the frame A may be readily lifted out from the bracket B. The heel portion of the frame A is secured to the pedal-base C, preferably by means of two screws, $b$. The frame A extends around and overlaps the edges of the mouth of the pedal-box D, and has a center bar, $d$, located between the pedals E. These pedals are slightly larger than the apertures left in the frame A and are pivoted at $e$ on the pedal-frame A. One end of the webbing F which operates the bellows G is attached to the hook H, designed to fit into lugs $h$ formed on the back of the pedal E, so that the webbing F may be readily detached from its pedal. I form several lugs $h$ on the back of the pedal E, so that the hook may be moved from one lug to the other for the purpose of tightening the webbing when necessary.

When the pedals E are made of wood, the lugs $h$ may be dispensed with, and holes made in the back of the pedal E can be substituted.

In order to get at the webbing F, for the purpose of tightening it, as described, it is merely necessary to remove the two screws $b$, when the frame A may be tilted up so as to expose the under side of the said frame.

From this description it will be seen that when the pedals E are not pressed down the tension on the webbing F will always keep them close up against the frame A. Consequently the pedal-box D is always closed when the organ is not in use, effectually preventing mice, dust, or anything else from entering the said box or reaching the bellows G.

What I claim as my invention is—

1. A removable frame fitting around the mouth of the pedal-box, in combination with a pedal or pedals pivoted to said frame and designed to close the mouth of the pedal-box, substantially as and for the purpose specified.

2. A frame, A, pivoted at $a$ to the pedal-bracket B and secured to the pedal-base C, in combination with the pedal E, pivoted at $e$ to the frame A, and connected to the bellows G by the webbing F, substantially as and for the purpose specified.

3. The webbing F, connected at one end to the bellows G and having a hook, H, fastened at its other end, in combination with the lugs $h$, formed on the back of the pedal E, substantially as and for the purpose specified.

Toronto, January 31, 1887.

SAMUEL JOHN LAUGHLIN.

In presence of—
CHARLES C. BALDWIN,
CHAS. H. RICHES.